United States Patent [19]

Mumme

[11] 3,842,681

[45] Oct. 22, 1974

[54] ANGULAR RATE SENSOR

[75] Inventor: Clarence D. Mumme, Phoenix, Ariz.

[73] Assignee: Sperry Rand Corporation, New York, N.Y.

[22] Filed: July 19, 1973

[21] Appl. No.: 380,629

[52] U.S. Cl. ............................................. 73/505
[51] Int. Cl. .......................................... G01c 19/56
[58] Field of Search .................................... 73/505

[56] References Cited
UNITED STATES PATENTS
2,514,250   7/1950   Meredith ............................. 73/505

FOREIGN PATENTS OR APPLICATIONS
611,011   10/1948   Great Britain ....................... 73/505

Primary Examiner—James J. Gill
Attorney, Agent, or Firm—Howard P. Terry

[57] ABSTRACT

A multiple axis angular rate inertial sensor measures the flexing of vibrating piezoelectric cantilevers induced by Coriolis forces, when the instrument is turned about an axis, in a mechanically resonant system excited by similar piezoelectric cantilever elements.

8 Claims, 1 Drawing Figure

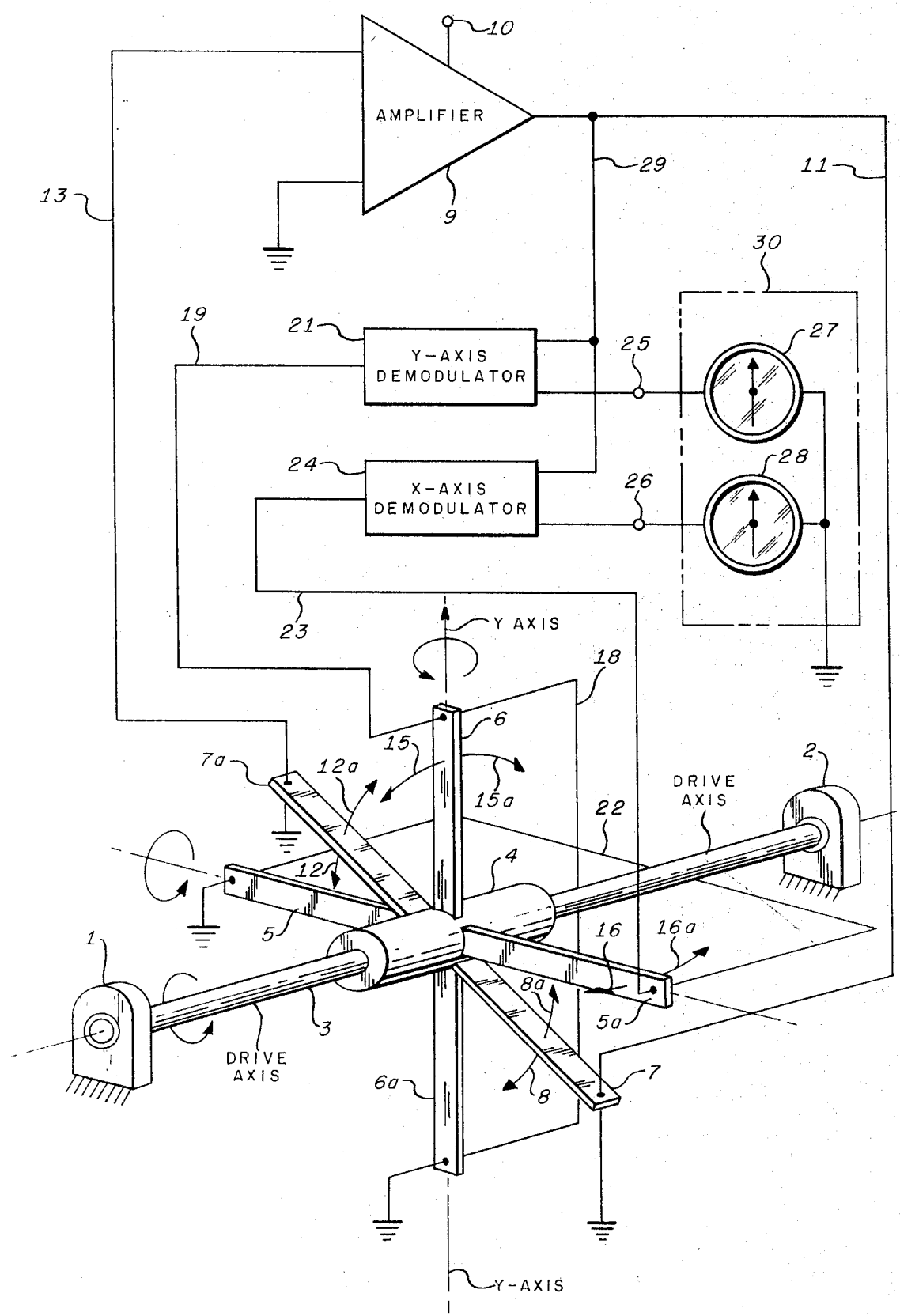

ANGULAR RATE SENSOR

BACKGROUND OF THE INVENTION

1. Field of the Invention

The invention pertains to the art of inertial measurement of the rate of turn of a vehicle about a predetermined axis and is more particularly concerned with instruments for measuring rate of turn about multiple axes by employing vibratory electric field sensitive cantilever elements as drivers and sensors in a mechanically resonant system which self-determines the frequency of its driving power.

2. Description of the Prior Art

Rate of turn sensors available in the prior art are generally classifiable as rotary and vibratory and are, in most cases, expensive to produce and to maintain and are often unreliable because of their complexity and because of the special nature of the bearings or other sensitive suspension means employed. Many of the prior rate of turn sensors are capable of sensing rate of turn about only one axis. Generally, prior art vibratory rate sensors have been very expensive because their designers were attempting to achieve accuracies, sensitivities, and other characteristics achieved only by high quality gyroscopic stabilization rate sensors. Various prior vibratory sensors have employed vibratory strands as in the Ferrill U.S. Pat. No. 2,466,018, vibratory beams as in the Lyman et al reissue U.S. Pat. No. 22,409, tuning forks, as in the Barnaby et al., U.S. Pat. No. 2,817,779, and the like. Piezoelectric crystals have also been employed in vibratory rate sensors, as in the Barnaby et al. U.S. Pat. No. 2,544,646. Many of these designs, due to their geometric configurations, are subject to large null errors produced by thermal expansion mismatches between the vibrating element and the electrical transducer bonded thereto. Others are unduly sensitive to shock and to linear acceleration, when they should be responsive only to angular rate of turn about prescribed axes.

SUMMARY OF THE INVENTION

The present invention is aimed at providing a vibratory rate sensor useful in aircraft stabilization wherein ultra precision is not essential and is therefore traded against economy of manufacture and reliability. The present invention contemplates a simple multiple axis vibratory angular rate of turn sensor employing vibratory electric field responsive cantilever elements as drivers and sensors in an integrated mechanically resonant oscillating system and comprises an improvement over the type of sensor disclosed in the aforementioned U.S. Pat. No. 2,544,646. The latter resonance feature substantially determines the oscillation frequency of the system, a piezoelectric cantilever sensor forming a part of the instrument and supplying an amplifier with a reference signal which, after amplification, is used to drive the mechanically resonant system, being fed for this purpose to a piezoelectric cantilever driver forming part of the instrument. Other piezoelectric vibratory sensors cooperate in the system to generate rate of turn output signals with reference to predetermined axes. The instrument is devoid of rotary bearings or other complex suspension arrangements, affords multiple axis sensing, is substantially free of sensitivity to linear acceleration, and its symmetrical cantilever design substantially reduces deleterious effects of temperature variations. These and other beneficial features of the invention will be discussed further in the following specification.

BRIEF DESCRIPTION OF THE DRAWINGS

The sole FIGURE presents a perspective view of the novel sensor along with a wiring diagram of its associated electrical control system showing components of the latter and their electrical interconnections.

DESCRIPTION OF THE PREFERRED EMBODIMENT

In the sole FIGURE, the novel multi-axis angular rate inertial sensor has associated with it a drive axis and $x$ and $y$ coordinate output axes, the instrument being affixed to the frame of a vehicle or other platform by supports 1 and 2 for sensing rates of turn about the mutually perpendicular $x$ and $y$ axes. Base supports 1 and 2 are arranged to support a preferably round wire or rod 3, such as a torsionally flexible rod supported at the drive axis of the device and being rigidly clamped at its ends within base supports 1 and 2 in a conventional and uniform manner. Rod 3 supports, in turn, a symmetrically located hub 4. Hub 4 acts in part as a symmetric support member for radially extending, cantilevered, vibratory elements 5, 5a, 6, 6a, 7 and 7a, these elements being firmly secured to hub 4 by any suitable conventional means, such as by cementing, brazing or clamping.

Each vibratory element 5, 5a, 6, 6a, 7, 7a is in the form of a cantilever rigidly secured at its base in hub 4 and has a free end remote from hub 4. The opposed vibratory elements 7 and 7a, for example, comprise thin electric-field responsive piezoelectric cantilevers of a known type. In such bender or bending transducers, an electric field applied between isolated electrically conductive films located on the broad surfaces of a strip of piezoelectric material causes the transducer to bend; an alternating electric field of substantially the resonant frequency of the cantilever 7 will cause it to vibrate as indicated by arrows 8, 8a. Audio amplifier 9, supplied with energy from a power supply (not shown) coupled to terminal 10, is used to provide via lead 11 the required electric driving field across vibratory driving member 7. It will be appreciated by those skilled in the art that the electrical connections to vibratory driver element 7 will preferably be made close to base 4 where deflection of element 7 with respect to hub 4 is minimum and that suitable flexible leads useful for this purpose will be employed, as are well known in the art. The electrical connections to element 7 and to other vibratory elements yet to be discussed are shown in the sole FIGURE at their free ends merely as a matter of convenience in simplifying the drawing.

In such bender transducers, an electric field is generated between isolated electrically conductive films located on the broad surfaces of the piezoelectric material when the transducer is bent so that the device may serve as an electrical pick-off. An alternating electric field having the resonant frequency of the cantilever 7a will be generated when the transducer free end is vibrated as indicated by arrows 12, 12a. The alternating voltage thus supplied by amplifier 9 to cause oscillation of the vibratory driver member 7 imparts motion to hub 4 as an oscillatory rotation of hub 4 about the device drive axis, thereby twisting and untwisting torsionable rod 3 in an oscillatory manner at the natural frequency of the elements. Such rotational oscillation of hub 4 causes energy to be directed into vibratory generator element 7a, causing it to vibrate, its end remote from hub 4 moving in the steady state, for example, as indicated by arrows 12, 12a. The consequence of the motion of vibratory generator element 7a is that an alternating voltage is generated representative of the phase and amplitude of the mechanical vibratory system comprising vibratory elements 7, 7a, hub 4, and rod 3, the mechanically resonant system thus being itself used via leads 11 and 13 and amplifier 9 to generate its own drive signal at its own resonant frequency. Any small compensating network to compensate for undesired phase shifts in amplifier 9 is readily incorporated therein using only arrangements well known to those skilled in the art.

Four vibratory rate of turn sensor elements are employed in balanced opposed pairs; these are vibratory bender sensor elements 5, 5a, and 6, 6a, each element being rigidly secured at its base on hub 4 and each having its free end remote from the clamping hub 4. As seen in the FIGURE, the broad faces of vibratory sensor elements 5, 5a, and 6, 6a axis, which are basically similar to vibratory generator element 7a, lie in a common 45 plane at right angles to the broad faces of elements 7, 7a. Vibratory sensor elements 5, 5a are located in opposed relation along the $x$ axis of the device for sensing vehicle turning rate thereabout. On the other hand, vibratory sensor elements 6, 6a are supported in opposed relation so that they sense the rate of turning of the vehicle about the $y$ axis. When the system is excited by amplifier 9, elements 5, 5a, 6, 6a experience oscillations as rigid elements in their common planes, but no bending moments are coupled to them. As long as the vehicle is not turning, they act merely to increase the moment of inertia of the vibratory system by a moderate factor.

When the vehicle is turned about the $x$ or $y$ axis or about both, a portion of the energy stored in the mechanically resonant system is conveyed to at least one pair of the vibratory sensor elements 5, 5a or 6, 6a, causing a vibration thereof in the bending mode. For example, if the vehicle is turned purely about the $y$ axis, Coriolis acceleration forces are exerted on vibratory sensor elements 6, 6a, and they are fed energy from the mechanically resonant system, provoking bending oscillation of each in the general sense of arrows 15, 15a. The amplitudes of the bending oscillations are proportional to the rate of turn of the vehicle, whereas the phase is related to the sense of the turn being experienced. In a similar manner, when the turning of the vehicle has a component about the $x$ axis, vibratory sensor elements 5, 5a will experience alternating bending moments and they will be driven to oscillate in the sense of arrows 16, 16a.

The rate of turn data-bearing signals generated by the opposed vibratory sensor elements 6, 6a are added by conductor 18 and are supplied by lead 19 to the $y$ axis demodulator 21. Similarly, the rate of turn data-bearing signals generated by the opposed vibratory sensor elements 5, 5a are added by lead 22 and are directed by lead 23 to the $x$ axis demodulator 24. As a phase reference for abstracting the rate of turn data, phase sensing demodulators 21 and 24 are supplied via lead 29 with a version of the output of amplifier 9 originally used to drive the mechanically resonant system. Phase sensing demodulators 21 and 24 may be used in the conventional manner to supply bipolar control signals via the respective terminals 25, 26 to utilization devices 30 of various types, such as for control or display purposes. For example, display 27 in the form of a zero-center direct current meter may be used to show the sense and amplitude of the rate of rotation with respect to the $y$-axis. In like manner, display 28 in the form of a second zero-center meter may be used to display the rate and sense of rotation of the vehicle about the $x$-axis. While axes $x$ and $y$ are shown in the sole FIGURE as mutually perpendicular, they may equally well be set at other angles for use in unusual coordinate systems. While the FIGURE illustrates the use of only two balanced pairs of vibrator sensors 5, 5a and 6, 6a, it will be appreciated that a greater number of such pairs of sensors may be employed.

Accordingly, it is seen that the invention is a relatively less complex, multiple axis vibratory angular rate sensor beneficially employing vibratory electric-field responsive cantilever elements as drivers and sensors in an integrated mechanically resonant oscillating system. The latter resonance feature substantially determines the oscillation frequency of the system, a piezoelectric cantilever sensor forming a part of the instrument and supplying a reference signal which, after amplification, is used to drive the mechanically resonant system, being fed for the purpose to a piezoelectric cantilever driver forming part of the instrument. Additional piezoelectric vibratory sensors generate rates of turn output signals with reference to predetermined axes. The instrument is devoid of rotary bearing or other delicate suspension elements, affords multiple axis sensing, and is substantially free of sensitivity to linear acceleration. The cantilevered vibratory elements, through being supported at one end only, substantially minimize any potential of differential thermal expansion effects.

Multiple axis turn rate sensing is achieved using only one vibratory driver element in a system that is substantially insensitive to linear acceleration. The latter feature is consequent of the fact that opposed cantilever sensors are used as sensing elements for each individual axis. Being disposed in balanced diametral relation on opposite sides of the hub 4, any bending moments caused by linear acceleration cause the generation of oppositely polarized voltages which are added because of the sense of connection of leads 18 and 22, yielding a net output that is substantially zero. The cantilevered nature of the vibratory elements substantially reduces the potential of differential temperature expansion effects.

While the invention has been described in its preferred embodiment, it is to be understood that the words which have been used are words of description rather than of limitation and that changes within the purview of the appended claims may be made without departing from the true scope and spirit of the invention in its broader aspects.

I claim:

1. An instrument for measuring angular rate of rotation of an object about at least a first axis comprising:

torsion rod means rigidly secured at each end thereof to said object and extending along a second axis normal to said first axis for torsional oscillation thereabout, first and second oppositely extending balanced vibratory cantilever means rigidly secured to said torsion rod means between said ends, said first vibratory cantilever means including electrically responsive vibration driver means for applying torsional oscillations to said torsion rod means, said second vibratory cantilever means including vibration pick-off means for providing an alternating electrical output signal of frequency proportional to the frequency of said torsional oscillations, and opposed cooperative radially extending vibratory electrically responding sensor means rigidly secured to said torsion rod means between said ends, angularly spaced from said first and second oppositely extending balanced vibratory cantilever means in a common plane and responsive to angular rate of rotation about said first axis for generating an output electrical signal representative in polarity and amplitude of said angular rate of rotation about said first axis.

2. Apparatus as described in claim 1 additionally including amplifier means responsive to said second oppositely extending balanced vibratory cantilever means vibration pick-off means for driving said first oppositely extending balanced vibratory cantilever means vibration driver means.

3. Apparatus as described in claim 2 further including:

second opposed cooperative radially extending vibratory electrically responding sensor means rigidly secured to said torsion rod means between said ends and responsive to angular rate of rotation about a second axis distinct from said first axis for generating an output signal representative in polarity and amplitude of said angular rate of rotation about said second axis.

4. Apparatus as described in claim 3 further including:

first demodulator means responsive to said opposed cooperative radially extending vibratory electrically responding sensor means and to said amplifier means, second demodulator means responsive to said second opposed cooperative radially extending vibratory electrically responding sensor means, and utilization means responsive to said first and second demodulator means.

5. Apparatus as described in claim 2 wherein said first oppositely extending balanced vibratory cantilever means comprises thin elongate electric-field-responsive piezoelectric cantilever means having a free end vibratable about said torsion rod means.

6. Apparatus as described in claim 5 wherein said second oppositely extending balanced vibratory cantilever means comprises thin elongate electric-field-generating piezoelectric cantilever means having a free end vibratable about said torsion rod means.

7. Apparatus as described in claim 6 wherein said opposed cooperative radially extending vibratory electrically responding sensor means comprise thin elongate electric-field-generating piezoelectric cantilever means having free ends vibratable parallel to said torsion rod means.

8. Apparatus as described in claim 1 wherein at least said first and second oppositely extending vibratory cantilever means and said opposed cooperative radially extending vibratory electrically responding means are each balanced with respect to said torsion rod for the purpose of rendering negligible the effects of linear acceleration of the instrument.

* * * * *